United States Patent
Miyashita et al.

(10) Patent No.: US 12,489,162 B2
(45) Date of Patent: Dec. 2, 2025

(54) BATTERY CASE AND MANUFACTURING METHOD THEREOF

(71) Applicant: DAIWA CAN COMPANY, Chiyoda-ku (JP)

(72) Inventors: Rio Miyashita, Sagamihara (JP); Masahiro Shiotani, Sagamihara (JP); Yasushi Enoki, Sagamihara (JP)

(73) Assignee: DAIWA CAN COMPANY, Chiyoda-ku (JP)

( * ) Notice: Subject to any disclaimer, the term of this patent is extended or adjusted under 35 U.S.C. 154(b) by 721 days.

(21) Appl. No.: 17/905,880

(22) PCT Filed: Feb. 2, 2021

(86) PCT No.: PCT/JP2021/003685
§ 371 (c)(1),
(2) Date: Sep. 8, 2022

(87) PCT Pub. No.: WO2021/181943
PCT Pub. Date: Sep. 16, 2021

(65) Prior Publication Data
US 2023/0155223 A1      May 18, 2023

(30) Foreign Application Priority Data
Mar. 12, 2020    (JP) .................... 2020-042719

(51) Int. Cl.
*H01M 50/186* (2021.01)
*H01M 10/04* (2006.01)
(Continued)

(52) U.S. Cl.
CPC ......... *H01M 50/186* (2021.01); *H01M 10/04* (2013.01); *H01M 50/103* (2021.01); *H01M 50/15* (2021.01)

(58) Field of Classification Search
None
See application file for complete search history.

(56) References Cited

U.S. PATENT DOCUMENTS

| | | | |
|---|---|---|---|
| 6,746,798 B1 | 6/2004 | Hiratsuka et al. | |
| 2009/0311594 A1* | 12/2009 | Uh ...................... | H01M 50/169 429/163 |

(Continued)

FOREIGN PATENT DOCUMENTS

| | | |
|---|---|---|
| JP | 63-239763 A | 10/1988 |
| JP | 8-77983 A | 3/1996 |

(Continued)

OTHER PUBLICATIONS

International Search Report issued Apr. 13, 2021 in PCT/JP2021/003685 filed Feb. 2, 2021, 2 pages.

*Primary Examiner* — Alix E Eggerding
(74) *Attorney, Agent, or Firm* — Oblon, McClelland, Maier & Neustadt, L.L.P.

(57) ABSTRACT

A battery case includes a mounting surface formed into a desired shape to place a sealing plate stably thereon. The battery case includes: an open box-shaped case body holding components of a battery; and a sealing plate that is integrated with the case body to close an opening of the case body. A stepped portion on which the sealing plate is placed is formed on an inner wall surface of the case body. The stepped portion includes: a mounting surface on which the sealing plate is placed; an opposed surface opposed to a periphery of the sealing plate placed on the mounting surface; and a depressed corner depressed outwardly from the opposed surface between the mounting surface and the opposed surface.

10 Claims, 4 Drawing Sheets

(51) Int. Cl.
 *H01M 50/103* (2021.01)
 *H01M 50/15* (2021.01)

(56) References Cited

U.S. PATENT DOCUMENTS

| | | | | |
|---|---|---|---|---|
| 2014/0370370 | A1* | 12/2014 | Kawase | H01M 50/15 |
| | | | | 219/121.64 |
| 2015/0140413 | A1 | 5/2015 | Suzuki et al. | |
| 2015/0318517 | A1* | 11/2015 | Suzuki | H01M 50/103 |
| | | | | 429/185 |

FOREIGN PATENT DOCUMENTS

| | | | |
|---|---|---|---|
| JP | 9-265966 | A | 10/1997 |
| JP | 10-284018 | A | 10/1998 |
| JP | 11-219688 | A | 8/1999 |
| JP | 2000-231908 | A | 8/2000 |
| JP | 2001-351582 | A | 12/2001 |
| JP | 2009-140753 | A | 6/2009 |
| JP | 2012-146433 | A | 8/2012 |
| JP | 2013-93119 | A | 5/2013 |
| JP | 2013-114798 | A | 6/2013 |
| JP | 2013-196777 | A | 9/2013 |
| JP | 2014-10910 | A | 1/2014 |
| JP | 2014-10936 | A | 1/2014 |
| JP | 6160185 | B2 | 7/2017 |
| JP | 2018-22586 | A | 2/2018 |
| WO | WO 99/25036 | A1 | 5/1999 |
| WO | WO 2018/025549 | A1 | 2/2018 |

\* cited by examiner

BATTERY CASE AND MANUFACTURING METHOD THEREOF

TECHNICAL FIELD

The present invention relates to a battery case for holding components of a battery including a positive plate, a negative plate, a separator, and an electrolyte, and a manufacturing method thereof. More specifically, the present invention relates to a battery case comprising an open box-shaped case and a sealing plate closing an opening of the battery case, and a manufacturing method thereof.

BACKGROUND ART

In the prior art, there is known a high-capacity secondary battery (i.e., an assembled battery) in which a plurality of lithium-ion cell stacks are connected to one another to be modularized. For example, such assembled battery may be employed in an electric vehicle to serve as an electric storage device. In order to fit the assembled battery easily into the electric vehicle, each cell of the cell stack is shaped into a rectangular or square shape.

A case of the cell stack is formed into an open box-shaped body by drawing and ironing a metallic plate, and an opening of the case is closed by a sealing plate to which a current collector and an electrode plate are attached. Specifically, the sealing plate is welded to the opening of the case by a laser welding method.

The sealing plate is fitted into an opening edge of the case, and periphery of the sealing plate is welded by a laser beam. Japanese Patent Laid-Open No. S63-239763 and a publication of Japanese patent No. 6160185 describe methods of forming a stepped portion on which the sealing plate is mounted on an inner surface of the case. According to the teachings of Japanese Patent Laid-Open No. S63-239763, the stepped portion is formed in the case by drawing and ironing the case. To this end, a punch having a desired shape to form the stepped portion is used in the drawing step and the ironing step, so as to form the stepped portion on the inner surface of the case.

According to the teachings of Japanese patent No. 6160185, first of all, an upper end of a side wall of an open box-shaped case is pushed outwardly thereby deforming the side wall to increase an opening area of the case. Thereafter, an outer wall protruded outwardly by pushing the case is removed by a cutting utensil.

SUMMARY OF INVENTION

Technical Problem to be Solved by the Invention

According to the teachings of Japanese Patent Laid-Open No. S63-239763, the stepped portion is formed by an ironing method. Specifically, the ironing is a method of changing a wall thickness by flowing a material plastically along a punch. That is, in a case of forming a stepped portion by the ironing method, the stepped portion would create resistance. In this case, if the material cannot be flown at a speed of the punch, the material would not be flown sufficiently to a portion ahead of the stepped portion, and a wall portion would be ruptured between a die and the stepped portion. In order to prevent such rupture of the wall portion, a speed of the punch has to be reduced. In other words, a processing speed has to be reduced. Otherwise, the processing speed may be increased by forming the stepped portion mildly. In this case, however, a mounting surface on which the sealing plate is installed may not be formed to be parallel to an opening edge, and hence the sealing plate would not be shaped into a desired shape.

According to the teachings of Japanese patent No. 6160185, a portion of the side wall at which the stepped portion is formed is pushed outwardly from inside of the case thereby deforming the side wall parallelly outwardly to form the stepped portion. In this case, if a clearance between a punch for pushing the side wall and a die supporting the portion of the side wall other than the portion to be deformed (i.e., a shift length) is too wide, the stepped portion would be inclined with respect to a horizontal surface (or a bottom surface). In this case, therefore, the sealing plate may not be supported stably. In addition, in the case of forming the stepped portion by pushing the inner surface as taught by Japanese patent No. 6160185, a rounded corner having a predetermined curvature radius is formed inevitably between a mounting surface facing toward the opening and the side wall pushed to be thinned. In this case, if each edge of the sealing plate is rectangular, the edge of the sealing plate would interfere with the rounded corner. Consequently, the sealing plate may not be installed on the mounting surface in a stable manner, and hence the sealing plate would rattle. Otherwise, if a curvature radius of a tip of the punch is reduced to reduce the curvature radius of the rounded corner, a portion of the side wall between the punch and the die would be ruptured.

The present invention has been conceived noting the above-explained technical problems, and it is therefore an object of the present invention to provide a battery case in which a mounting surface is formed into a desired shape to install a sealing plate stably thereon, and a manufacturing method thereof.

Means for Solving the Problem

According to one aspect of the present invention, there is provided a battery case, comprising: an open box-shaped case body holding components of a battery; and a sealing plate that is integrated with the case body to close an opening of the case body. In order to achieve the above-explained objectives, according to the present invention, a stepped portion on which the sealing plate is placed is formed on an inner wall surface of the case body. In the battery case, the stepped portion comprises a mounting surface on which the sealing plate is placed, an opposed surface opposed to a periphery of the sealing plate placed on the mounting surface, and a depressed corner depressed outwardly from the opposed surface between the mounting surface and the opposed surface.

According to the present invention, the depressed corner may be formed such that a thickness of a side wall of the case body increases gradually from an outermost portion of the depressed corner toward the opposed surface.

According to the present invention, the depressed corner may comprise: a first section leading from an outermost portion in the case body at a predetermined curvature; and a second section leading from the first section to the opposed surface while being inclined or curved at a curvature different from the predetermined curvature of the first section.

According to another aspect of the present invention, there is provided a manufacturing method of a battery case, in which a stepped portion is formed on a predetermined portion of an inner wall surface of an open box-shaped case body by pushing the inner wall surface between the predetermined portion and an opening of the case body, and in which a sealing plate placed on the stepped portion is integrated with the case body. In order to achieve the above-explained objectives, according to the present invention, the manufacturing method comprises: forming a depressed corner and a mounting surface on which the sealing plate is placed by depressing the predetermined portion of the inner wall surface to a predetermined depth; and thereafter forming the stepped portion by pushing a portion of the inner wall surface closer to the opening than the depressed corner thereby reducing a thickness of a side wall of the case body at the pushed portion thinner than a thickness of a portion of the side wall opposite to the opening.

According to the present invention, the depressed corner may be depressed deeper than the pushed portion of the inner wall surface closer to the opening than the depressed corner.

According to the present invention, the depressed corner and the mounting surface may be formed by pushing the inner wall surface of the case body, using a punch having a bottom surface parallel to a bottom surface of the case body, and a leading edge having an acute angle protruding toward the inner wall surface of the case body.

According to the present invention, the leading edge of the punch may be rounded into a first curved surface having a predetermined curvature, and an upper surface of the punch opposite to the bottom surface may be withdrawn away from the rounded leading edge.

According to the present invention, an outer wall of the punch between the leading edge and the upper surface may have an inclined surface or a second curved surface having a curvature different from the curvature of the first curved surface.

According to the present invention, the case body may be formed such that an upper end thereof is higher than a designed height before forming the mounting surface and the depressed corner, and the upper end of the case body may be trimmed at the designed height or a level higher than the designed height before forming the mounting surface and the depressed corner.

According to the present invention, the upper end of the case body may be trimmed at the designed height after forming the stepped portion.

Advantageous Effects of Invention

According to the present invention, the stepped portion is formed in the case body. As described, the stepped portion comprises: the mounting surface on which the sealing plate is placed; the opposed surface opposed to the periphery of the sealing plate placed on the mounting surface; and the depressed corner depressed outwardly from the opposed surface. Thus, there is no protrusion protruding inwardly in the case body such as a corner between the opening and the mounting surface. Therefore, the sealing plate may be fitted into the opening to be placed on the mounting surface without contacting to the inner wall surface of the case body. For this reason, the sealing plate may be positioned accurately on the mounting surface to be attached properly to the case body.

In addition, according to the present invention, the depressed corner and the mounting surface on which the sealing plate is placed are formed by depressing a predetermined portion of the inner wall surface to a predetermined depth, and thereafter, the stepped portion is formed by pushing a portion of the inner wall surface closer to the opening than the depressed corner thereby reducing a thickness of the side wall at the pushed portion. Therefore, the material of the side wall will not flow plastically toward the mounting surface when pushing the portion of the inner wall surface closer to the opening than the depressed corner. Even if such plastic flow toward the mounting surface is caused, the material flowing toward the mounting surface may be absorbed by the depressed corner. For this reason, the mounting surface will not be deformed from a designed shape when pushing the inner wall surface to form the opposed surface so that the sealing plate may be held in a stable manner.

Further, the leading edge of the punch used to form the rounded corner is rounded into the first curved surface having a predetermined curvature, and the upper surface of the punch opposite to the bottom surface is withdrawn away from the rounded leading edge. Therefore, a plastic flow of the material may be expedited in the portion of the side wall close to the opening by a component of a pushing load applied to the side wall from the outer wall of the punch. For this reason, the mounting surface will not be deformed from the designed shape, and hence the sealing plate may be held in a stable manner.

Furthermore, the upper end of the case body is trimmed before forming the mounting surface and the depressed corner. Therefore, a plastic flow of the material may be expedited in the portion of the side wall close to the opening when forming the mounting surface or the rounded corner, or when forming the opposed surface. For this reason, the mounting surface will not be deformed from the designed shape, and hence the sealing plate may be held in a stable manner.

DESCRIPTION OF EMBODIMENT(S)

Figure 1:
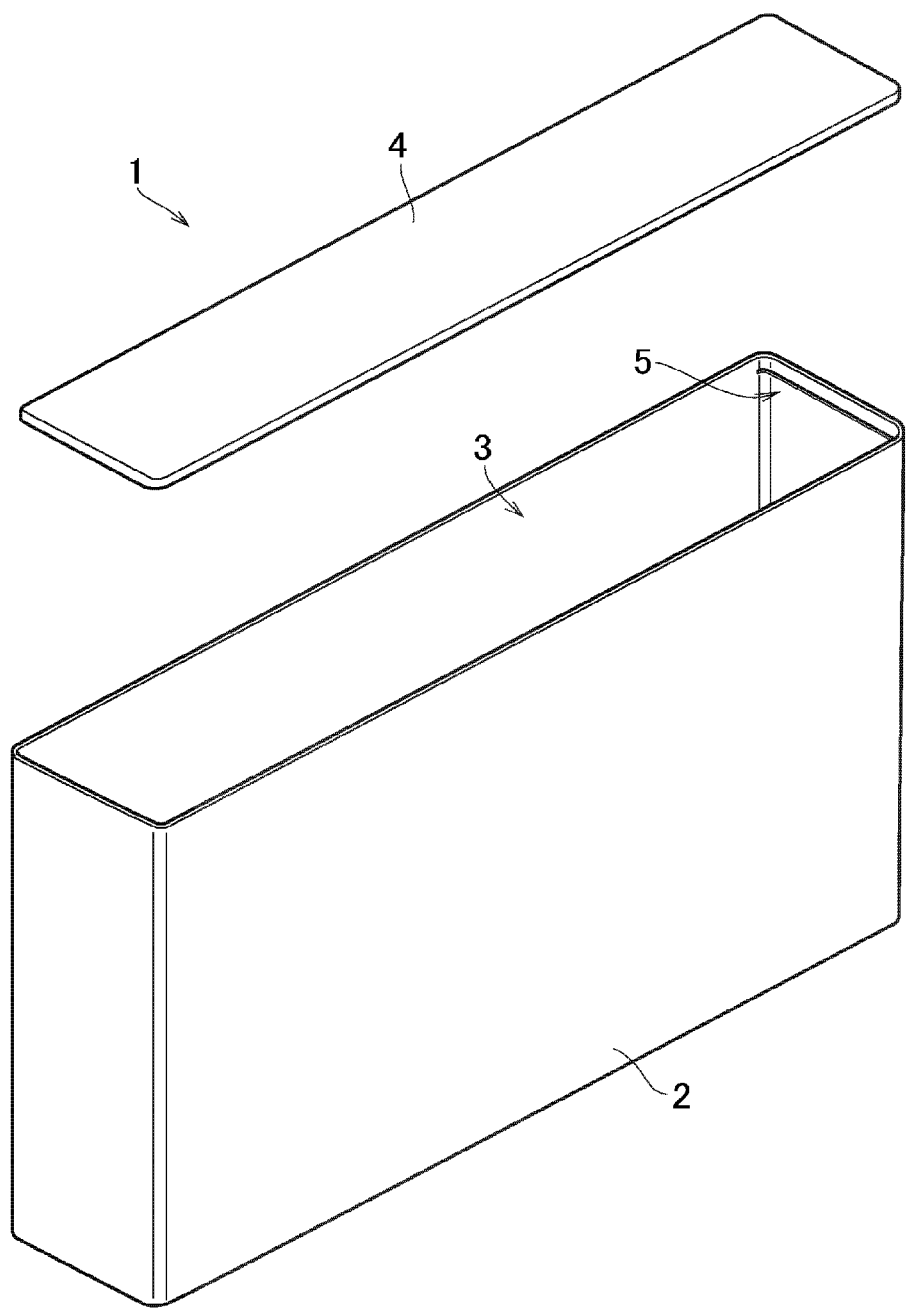
FIG. 1 is a perspective view showing one example of a battery case to which the present invention is applied.

Turning now to FIG. 1, there is shown one example of a battery case 1 according to the present invention. The battery case 1 comprises an open box-shaped case body 2, and a sealing plate 4 closing an opening 3 of the case body 2 liquid-tightly. For example, components of a battery such as a positive plate, a negative plate, a separator, an electrolyte etc. are held in the battery case 1.

The case body 2 is formed by drawing and ironing a plate material made of e.g., aluminum alloy. Although the case body 2 shown in FIG. 1 has a rectangular cross-sectional shape, the case body 2 may also be formed into a cylindrical shape having a circular cross-section. In addition, the case body 2 may also be formed into a shape in which a cross-sectional shape of the opening 3 and a cross-sectional shape of the bottom are different.

As the case body 2, the sealing plate 4 is also made of metallic material such as aluminum alloy, and dimensions of the sealing plate 4 are substantially identical to inner dimensions of the opening 3. That is, the sealing plate 4 is fitted into the opening 3. The sealing plate 4 is formed into a desired shape by pressing a plate blank, and for example, through holes may be formed in the sealing plate 4 to attach a not shown electrode and a not shown current collector and so on to the sealing plate 4.

The sealing plate 4 is fitted into the opening 3 of the case body 2 holding the plates, the electrolyte and so on, and an outer circumference of the sealing plate 4 is welded to an inner circumference of the case body 2 by a laser beam.

If the sealing plate 4 being fitted into the opening 3 is unstable, the sealing plate 4 would be welded poorly to the case body 2, and in addition, the components of the battery held in the case body 2 would be exposed to the laser beam. Therefore, in order to fix a position of the sealing plate 4 in the case body 2, a stepped portion 5 is formed in the case body 2. The stepped portion 5 is formed on an inner wall surface of the case body 2 such that a cross-sectional area of the opening 3 is expanded wider than a cross-sectional area of the bottom. That is, the stepped portion 5 is a boundary at which the cross-sectional area of the case body 2 is changed. In the case body 2, specifically, the stepped portion 5 is situated at a level closer to the bottom than the opening 3 at a distance corresponding to a thickness of the sealing plate 4. In the example shown in FIG. 1, the stepped portion 5 is formed along each short side of the case body 2. Instead, the stepped portion 5 may also be formed along each long side of the case body 2, or along all sides of the case body 2.

Figure 2:
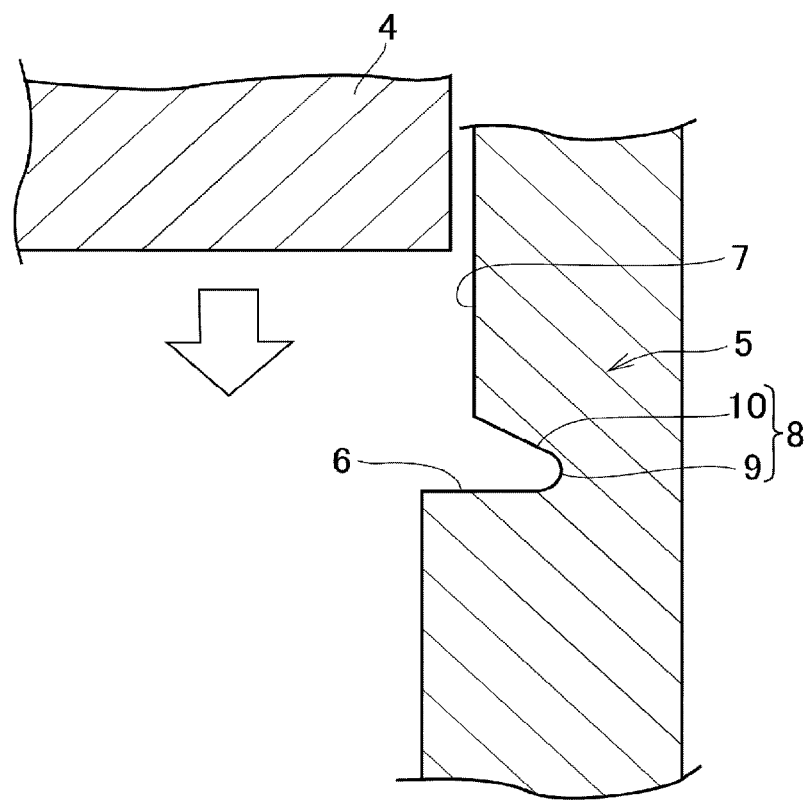
FIG. 2 is an enlarged cross-sectional view showing a cross-section of a stepped portion according to the present invention.

A cross-sectional shape of the stepped portion 5 is shown in FIG. 2 in an enlarged scale. The stepped portion 5 comprises: a mounting surface 6 on which the sealing plate 4 is placed; an inner surface (referred to as opposed surface hereinafter) 7 opposed to a periphery of the sealing plate 4 between the mounting surface 6 and the opening 3; and a depressed corner 8 depressed outwardly from the opposed surface 7 such that a thickness of the case body 2 increases gradually from an outermost portion toward the opposed surface 7.

The depressed corner 8 shown in FIG. 2 comprises: a rounded section 9 leading from an outer end (i.e., an outermost portion in the case body 2) of the mounting surface 6 upwardly (toward the opening 3) at a predetermined curvature; and a slant section 10 leading from an end portion of the rounded section 9 toward the opposed surface 7. Thus, the depressed corner 8 is formed into a configuration such that an edge of the sealing plate 4 placed on the mounting surface 6 will not interfere (or contact) therewith. The configuration of the depressed corner 8 should not be limited to that shown in FIG. 2. For example, the depressed corner 8 may also be formed only of the slant section 10 without forming the rounded section 9 between the mounting surface 6 and the opposed surface 7. Otherwise, the depressed corner 8 may also be formed only of the rounded section 9 formed between the mounting surface 6 and the opposed surface 7.

By thus forming the depressed corner 8 in the case body 2, a corner between the mounting surface 6 and the opposed surface 7 is not located in an inner side of the case body 2. That is, the inner wall surface does not exist inside of the opposed surface 7 between the opening 3 and the mounting surface 6. Therefore, the sealing plate 4 may be fitted into the opening 3 to be placed on the mounting surface 6 without contacting to the inner wall surface of the case body 2. For this reason, the sealing plate 4 may be positioned accurately on the mounting surface 6 to be attached properly to the case body 2. In addition, since the edge of the sealing plate 4 will not come into contact to the inner wall surface of the case body 2, the sealing plate 4 will not be inclined even if the edge of the sealing plate 4 is rectangular. For this reason, man-hour required to chamfer the sealing plate 4 may be reduced. Further, since the sealing plate 4 is positioned accurately at a desired site on the mounting surface 6, an upper edge of the sealing plate 4 may be aligned with an upper end of the opening 3. For this reason, the sealing plate 4 may be welded properly to the opening 3 by the laser beam. Furthermore, since the sealing plate 4 is placed on the mounting surface 6, a gap between the opposed surface 7 and the inner wall surface below the stepped portion 5 may be reduced. In other words, a difference between a thickness of the opposed surface 7 and a wall thickness below the stepped portion 5 may be reduced. That is, the opposed surface 7 will not be thinned excessively by the stepped portion 5. For this reason, rigidity of the battery case 1 will not be reduced.

Figure 3:
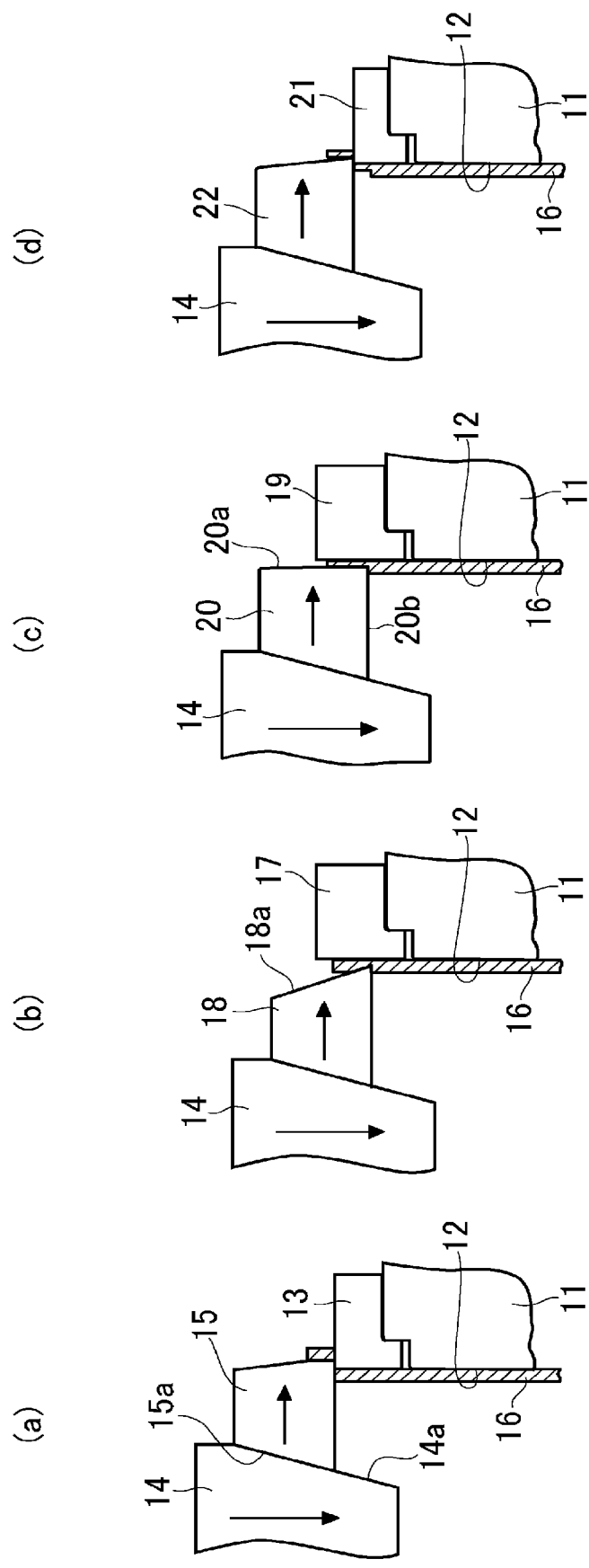
FIG. 3 is an explanatory chart showing one example of a manufacturing method of the battery case according to the present invention.

Next, here will be explained a manufacturing method of the case body 2 shown in FIG. 1. Turning to FIG. 3, there is shown a procedure of manufacturing the case body 2. According to the example shown in FIG. 3, first of all, an upper end of an open box-shaped body formed by drawing and ironing a blank is trimmed preliminary. That is, when the blank is shaped into the open box-shaped case body 2 by the drawing and the ironing, a height of the upper end of the case body is higher than a designed (or desired) height. Therefore, in order to expedite a plastic flow of the material in the vicinity of the opening 3 when pushing the inner wall surface of the case body 2 to form the opposed surface 7 and the depressed corner 8 as explained later, a portion of the case body 2 predetermined distance higher than a portion at which the stepped portion 5 is to be formed is trimmed preliminary.

First of all, at a step shown in FIG. 3 (*a*), the case body 2 formed into a predetermined shape is inserted into a support member 11 to a predetermined depth. Specifically, the support member 11 is a metallic mold having a depression (referred to as holder hereinafter) 12 for holding a portion of the case body 2 lower than the level at which the stepped portion 5 is to be formed. A trimming die 13 is fixed on an upper surface of the support member 11 at a predetermined level to trim the case body 2 preliminary. Specifically, a portion of the upper surface of the support member 11 adjacent to the holder 12 is depressed, and a portion of the die 13 adjacent to the holder 12 is protruded to be engaged with the depression of the support member 11. Therefore, a load to push the die 13 from the holder 12 side is received by the support member 11 and hence the die 13 is prevented form being moved by such load applied thereto.

A rod 14 and a punch 15 are positioned inside of the case body 2. In the case body 2, the rod 14 is allowed to reciprocate in the vertical direction, and the punch 15 is connected to the rod 14 through a cam mechanism so that the punch 15 is reciprocated in the horizontal direction by reciprocating the rod 14 in the vertical direction. To this end, a tapered surface 14*a* is formed on an outer circumferential surface of the rod 14, and a mating surface 15*a* is formed on the punch 15 to be contacted to the tapered surface 14*a* of the rod 14.

That is, the punch 15 being situated at the predetermined level to trim the case body 2 preliminary is moved toward a side wall 16 of the case body 2 by moving the rod 14 downwardly. Consequently, the case body 2 is trimmed at the predetermined level by a shearing force established by the punch 15 and the die 13.

Thereafter, at a step shown in FIG. 3 (*b*), the mounting surface 6 and the depressed corner 8 are formed on the inner wall surface of the case body 2. To this end, a die 17 whose height is higher than a trimmed upper end of the side wall 16 of the case body 2 is mounted on the support member 11. Specifically, the die 17 is engaged with the support member 11 by the above-explained manner to engage the die 13 employed at the step shown in FIG. 3 (*a*) with the support member 11. At this step, the punch 15 is replaced with a punch 18 for forming the mounting surface 6 and the depressed corner 8.

The punch 18 has an outer wall 18*a* to push the inner wall surface of the case body 2, and a configuration of the outer wall 18*a* is congruent with a configuration of the depressed corner 8. Specifically, in order to form the depressed corner 8 shown in FIG. 2, in the punch 18, a lower surface is formed into a horizontal surface, the outer wall 18*a* is inclined such that a lower end thereof is protruded, and a lower edge of the outer wall 18*a* is rounded. That is, an upper surface of the punch 18 is withdrawn away from the rounded edge (or leading edge). As the punch 15 employed at the step shown in FIG. 3 (*a*), the punch 18 is also connected to the rod 14 through a cam mechanism.

Given that a thickness of the side wall 16 is 2 mm, it is preferable to set a curvature radius of the rounded lower edge of the punch 18 to 0.5 mm or shorter. Consequently, a damage of the rounded lower edge of the punch 18 may be limited, and a crack and rapture of the side wall 16 may be prevented.

At this step, the punch 18 is moved toward the side wall 16 of the case body 2 by moving the rod 14 downwardly. Consequently, the side wall 16 is pressed by the punch 18 thereby forming the mounting surface 6 and the depressed corner 8. As described, the punch 18 has the inclined outer wall 18*a*. In this situation, therefore, a vertical component of a pushing load is applied to the side wall 16 of the case body 2 from the outer wall 18*a* of the punch 18, in addition to a load compressing the side wall 16. For this reason, an upward plastic flow in the side wall 16 may be expedited, and hence the mounting surface 6 may be formed horizontally. To this end, a travel distance of the punch 18 is increased longer than a travel distance of an after-mentioned punch 20. Specifically, the travel distance of the punch 18 is adjusted to push the side wall 16 further than the opposed surface 7 to be formed at the subsequent step. An opening of the depressed corner 8 opening toward an internal space of the case body 2 may be set in such a manner that the edge of the sealing plate 4 placed on the mounting surface 6 will not interfere with the depressed corner 8. Specifically, an opening height of the depressed corner 8 is set shorter than the thickness of the sealing plate 4 in the height direction of the case body 2.

Thereafter, at a step shown in FIG. 3 (*c*), the opening 3 is formed to have desired dimensions by pushing a portion of the side wall 16 above the stepped portion 5. In other words, the opposed surface 7 is formed. To this end, a die 19 whose height is higher than the upper end of the side wall 16 of the case body 2 is mounted on the support member 11. At this step, the die 17 employed at the step shown in FIG. 3 (*b*) may also be employed. Specifically, the die 19 is engaged with the support member 11 by the above-explained manner to engage the die 13 employed at the step shown in FIG. 3 (*a*) with the support member 11. At this step, the punch 18 is replaced with a punch 20 for forming the opposed surface 7 by pushing the side wall 16.

Figure 4:
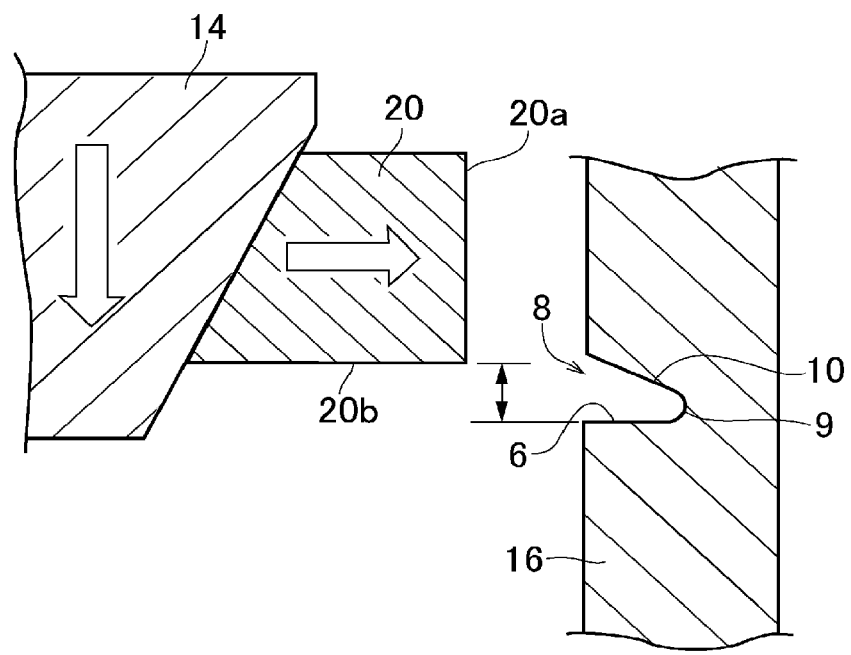
FIG. 4 is an enlarged cross-sectional view showing a cross-section of a punch pushing a side wall to form an opposed surface.

The punch 20 has an outer wall 20*a* to push the inner wall surface of the case body 2, and the outer wall 20*a* is formed parallel to the side wall 16. Specifically, as depicted in FIG. 4, the punch 20 is arranged such that a lower surface 20*b* thereof is situated at a level higher than the mounting surface 6. As the punch 15 employed at the step shown in FIG. 3 (*a*), the punch 20 is also connected to the rod 14 through a cam mechanism.

At this step, the punch 20 is moved toward the side wall 16 of the case body 2 by moving the rod 14 downwardly. Consequently, the side wall 16 is pressed by the punch 20 to be thinned so that the opposed surface 7 is formed. In this situation, since the depressed corner 8 has already been formed, a cross-sectional area of the side wall 16 at the depressed corner 8 is narrower than a cross-sectional area of the side wall 16 above the depressed corner 8. For this reason, an upward plastic flow in the side wall 16 between the punch 20 and the die 19 may be expedited. In this situation, even if a downward plastic flow is caused accidentally in the side wall 16, an opening area of the depressed corner 8 would be reduced slightly to absorb the material flowing downwardly toward the mounting surface. For this reason, the mounting surface 6 will not be deformed. Thus, the mounting surface 6 may be maintained in a horizontal fashion by pushing the side wall 16 to form the opposed surface 7 after forming the depressed corner 8.

Thereafter, at a step shown in FIG. 3 (*d*), the upper end of the side wall 16 is trimmed again to adjust a height of the case body 2 to a designed height. To this end, a die 21 having a desired height to trim the side wall 16 of the case body 2 is mounted on the support member 11. Specifically, the die 21 is engaged with the support member 11 by the above-explained manner to engage the die 13 employed at the step shown in FIG. 3 (*a*) with the support member 11. At this step, the punch 20 is replaced with a punch 22 having a sharp edge of an acute angle to trim the side wall 16. As the punch 15 employed at the step shown in FIG. 3 (*a*), the punch 22 is also connected to the rod 14 through a cam mechanism.

At this step, the punch 22 being situated at a desired level to trim the side wall 16 is moved toward the side wall 16 of the case body 2 by moving the rod 14 downwardly. Consequently, the case body 2 is trimmed at the desired level by a shearing force established by the punch 22 and the die 21.

Thus, the stepped portion 5 is formed by forming the depressed corner 8 first of all, and then pushing the portion of the side wall 16 closer to the opening 3 than the mounting surface 6 thereby reducing the thickness of the side wall 16. Therefore, the material of the side wall 16 will not flow plastically toward the mounting surface 6 when pushing the side wall 16. For this reason, the mounting surface 6 may be formed into a desired shape (i.e., in a horizontal fashion). In addition, the outer wall 18*a* of the punch 18 used to form the depressed corner 8 comprises the rounded section and the slant section. Therefore, the material of the side wall 16 will not flow plastically toward the mounting surface 6 when forming the depressed corner 8. For this reason, the mounting surface 6 may be formed into a desired shape (i.e., in a horizontal fashion). Further, the upper end of the case body 2 is trimmed preliminary before forming the depressed corner 8. Consequently, a resistance against the plastic flow of the material toward the upper end of the case body 2 can be reduced when pushing the side wall 16 to form the depressed corner 8. For this reason, the mounting surface 6 may be formed into a desired shape (i.e., in a horizontal fashion). In the case body 2 formed by the above-explained procedures, the sealing plate 4 may be placed in a stable manner. Therefore, the sealing plate 4 may be welded properly by the laser beam, and the components of the battery held in the case body 2 can be prevented from being exposed to the laser beam.

The invention claimed is:

1. A battery case, comprising:
   an open box-shaped case body holding components of a battery;
   a sealing plate that is integrated with the case body to close an opening of the case body; and
   a stepped portion on which the sealing plate is placed, and which is formed on an inner wall surface of the case body,
   wherein the stepped portion comprises a mounting surface on which the sealing plate is placed, an opposed surface opposed to a periphery of the sealing plate placed on the mounting surface, and a depressed corner depressed outwardly from the opposed surface between the mounting surface and the opposed surface.

2. The battery case as claimed in claim 1, wherein the depressed corner is formed such that a thickness of a side wall of the case body increases gradually from an outermost portion of the depressed corner toward the opposed surface.

3. The battery case as claimed in claim 1, wherein the depressed corner comprises: a first section leading from an outermost portion in the case body at a predetermined curvature; and a second section leading from the first section to the opposed surface while being inclined or curved at a curvature different from the predetermined curvature of the first section.

4. A manufacturing method of a battery case, in which a stepped portion is formed on a predetermined portion of an inner wall surface of an open box-shaped case body by pushing the inner wall surface between the predetermined portion and an opening of the case body, and in which a sealing plate placed on the stepped portion is integrated with the case body, comprising:
   forming a depressed corner and a mounting surface on which the sealing plate is placed by depressing the predetermined portion of the inner wall surface to a predetermined depth; and
   thereafter forming the stepped portion by pushing a portion of the inner wall surface closer to the opening than the depressed corner thereby reducing a thickness of a side wall of the case body at the pushed portion thinner than a thickness of a portion of the side wall opposite to the opening.

5. The manufacturing method of the battery case as claimed in claim 4, wherein the depressed corner is depressed deeper than the pushed portion of the inner wall surface closer to the opening than the depressed corner.

6. The manufacturing method of the battery case as claimed in claim 4, wherein the depressed corner and the mounting surface are formed by pushing the inner wall surface of the case body, using a punch having a bottom surface parallel to a bottom surface of the case body, and a leading edge having an acute angle protruding toward the inner wall surface of the case body.

7. The manufacturing method of the battery case as claimed in claim 6, wherein the leading edge of the punch is rounded into a first curved surface having a predetermined curvature, and an upper surface of the punch opposite to the bottom surface is withdrawn away from the rounded leading edge.

8. The manufacturing method of the battery case as claimed in claim 7, wherein an outer wall of the punch between the leading edge and the upper surface has an inclined surface or a second curved surface having a curvature different from the curvature of the first curved surface.

9. The manufacturing method of the battery case as claimed in claim 4,
   wherein the case body is formed such that an upper end thereof is higher than a designed height before forming the mounting surface and the depressed corner, and
   the upper end of the case body is trimmed at the designed height or a level higher than the designed height before forming the mounting surface and the depressed corner.

10. The manufacturing method of the battery case as claimed in claim 4, wherein an upper end of the case body is trimmed at the designed height after forming the stepped portion.

* * * * *